United States Patent
Pitt (10) Patent No.: US 10,662,809 B2
(45) Date of Patent: May 26, 2020

(54) VANE COOLING SYSTEM

(71) Applicant: ROLLS-ROYCE plc, London (GB)

(72) Inventor: Simon Pitt, Derby (GB)

(73) Assignee: ROLLS-ROYCE PLC, London (GB)

(*) Notice: Subject to any disclaimer, the term of this patent is extended or adjusted under 35 U.S.C. 154(b) by 84 days.

(21) Appl. No.: 15/945,753

(22) Filed: Apr. 5, 2018

(65) Prior Publication Data

US 2018/0291763 A1 Oct. 11, 2018

(30) Foreign Application Priority Data

Apr. 6, 2017 (GB) .................................. 1705552.6

(51) Int. Cl.
| | |
|---|---|
| *F01D 25/12* | (2006.01) |
| *F01D 9/02* | (2006.01) |
| *F01D 9/06* | (2006.01) |
| *F01D 9/04* | (2006.01) |

(52) U.S. Cl.
CPC ............... *F01D 25/12* (2013.01); *F01D 9/02* (2013.01); *F01D 9/023* (2013.01); *F01D 9/041* (2013.01); *F01D 9/06* (2013.01); *F01D 9/065* (2013.01); *F05D 2220/32* (2013.01); *F05D 2220/323* (2013.01); *F05D 2240/12* (2013.01); *F05D 2260/201* (2013.01); *Y02T 50/675* (2013.01)

(58) Field of Classification Search
CPC . F01D 9/02; F01D 9/023; F01D 9/041; F01D 9/06; F01D 9/065; F01D 25/12; F05D 2220/32; F05D 2220/323; F05D 2240/12; F05D 2260/201; Y02T 50/675
See application file for complete search history.

(56) References Cited

U.S. PATENT DOCUMENTS

| | | | |
|---|---|---|---|
| 6,779,967 B2 | 8/2004 | Friedl et al. | |
| 2003/0161719 A1* | 8/2003 | Friedl | F02C 7/12 415/116 |
| 2008/0112791 A1* | 5/2008 | Lee | F01D 9/065 415/58.4 |
| 2009/0293495 A1 | 12/2009 | Correia et al. | |
| 2016/0017750 A1* | 1/2016 | Lefebvre | F01D 25/12 415/175 |

(Continued)

FOREIGN PATENT DOCUMENTS

| | | |
|---|---|---|
| EP | 1921292 | 5/2008 |
| WO | 2014105515 | 7/2014 |

OTHER PUBLICATIONS

Great Britain Search Report dated Sep. 22, 2017, issued in GB Patent Application No. 1705552.6.

*Primary Examiner* — David E Sosnowski
*Assistant Examiner* — Sang K Kim
(74) *Attorney, Agent, or Firm* — Brinks Gilson & Lione (57) ABSTRACT

A vane cooling system for a gas turbine engine comprises a vane (21) arranged on a stator and having a chamber (23) extending continuously from a radially inner end to a radially outer end of the vane. The vane (21) has; a radially inner inlet (24) and a radially outer inlet (25), a first cooling fluid feed (39) in communication with the radially inner inlet (24) and a second cooling fluid feed (28) in communication with the radially outer inlet (25), The first cooling fluid feed (39) has a higher pressure than the second cooling feed (28). A flow adjustment device (30) is arranged for adjusting a flow of the second cooling fluid feed into the radially outer inlet (25).

15 Claims, 5 Drawing Sheets

(56) References Cited

U.S. PATENT DOCUMENTS

2016/0290157 A1* 10/2016 Ning .................. F01D 11/08
2017/0234144 A1* 8/2017 Mugglestone .......... F01D 5/188
                                                    415/178

* cited by examiner

VANE COOLING SYSTEM

CROSS-REFERENCE TO RELATED APPLICATIONS

This application is based upon and claims the benefit of priority from British Patent Application Number 1705552.6 filed 6 Apr. 2017, the entire contents of which are incorporated by reference.

FIELD OF THE DISCLOSURE

The present disclosure is concerned with the cooling of vanes in a gas turbine engine. More particularly, the present disclosure is concerned with cooling vanes by introducing cooling air into a cavity within the vane during operation of the gas turbine engine, where the cooling air is drawn from a supply present within the operating engine.

BACKGROUND

Vanes are commonly arranged in a circumferential array spanning an annulus through which a working fluid is directed. A vane typically comprises an aerofoil with a pressure side wall and a suction side wall which meet one another at a leading edge and a trailing edge. The pressure and suction side walls border a central chamber into which cooling air may be delivered through a radially directed inlet. An array of outlets is commonly provided adjacent the trailing edge of the vane. The outlets are directed to deliver spent cooling air into the main working fluid flow which is directed over the pressure side wall and suction side wall.

The provision of air systems, in particular cooling-air systems for gas turbine engines, is known. Often, such systems when provided for cooling purposes in the hot section of the engine are dimensioned or designed such that they give adequate cooling under the most adverse conditions, for example at maximum power and the associated highest temperature ranges. Commonly, the source of cooling air is air taken off from the compressor.

During different operating conditions, the temperature of the hot section varies and can often be below the highest experienced. Consequently, non-adaptive cooling systems can result in excessive air mass flow and overcooling under operating conditions requiring lesser cooling. A larger air mass than is needed is supplied to the turbine and subsequently exhausted. Where the cooling air is sourced from the compressor, the efficiency of the turbine is compromised leading to increased specific fuel consumption and in the case of aircraft powered by such engines, the range of the aircraft may be reduced.

Prior published U.S. Pat. No. 6,779,967B2 seeks to address the described limitations by introducing adaptive valve control. An embodiment described in U.S. Pat. No. 6,779,967B2 is reproduced in FIG. 1.

Figure 1:
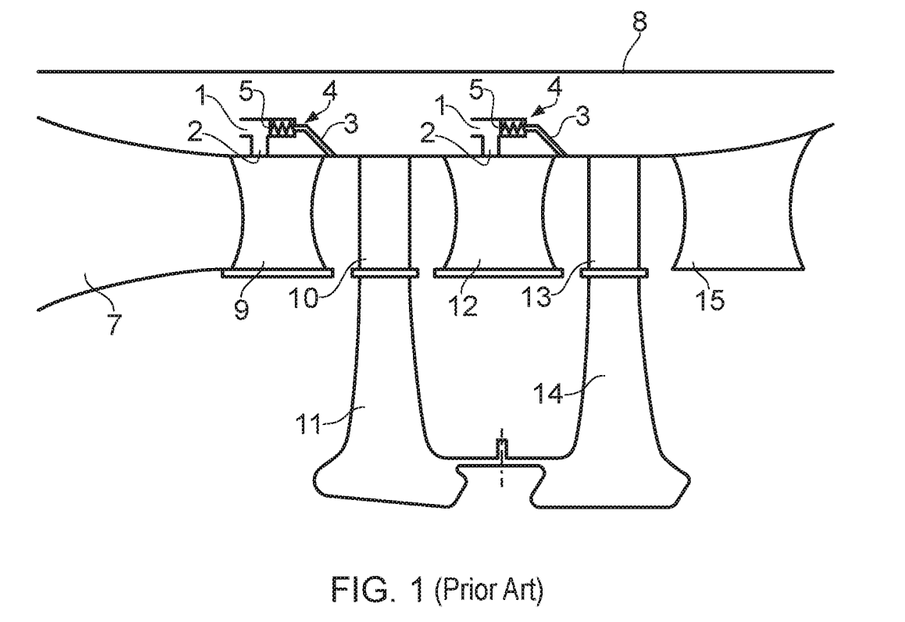
FIG. 1 shows a vane cooling system for a gas turbine engine as is known from the prior art.

FIG. 1 shows, in highly simplified representation, a side view of a partial area of an aircraft gas turbine. A combustion chamber is here indicated by the reference numeral 7. A downstream turbine features a turbine casing 8 within which stator vanes 9 of a first stage and rotor blades 10 of the first stage are shown. The rotor blades 10 are attached to a rotor disk 11 of the first stage in a conventional manner. Further in the downstream direction, a stator vane 12 of a second stage is shown which is associated with a rotor blade 13 of the second stage, this rotor blade 13 again being attached to a rotor disk 14 of the second stage. Reference numeral 15 indicates a turbine exit guide vane.

FIG. 1 further shows, in highly simplified form, a piston-cylinder unit 4 which is a part of an embodiment of the device for air mass flow control according to the present disclosure. The piston-cylinder unit 4 is located in the area of an inlet duct 1, exposed to a cooling air flow, with flow in the inlet duct issuing into an air duct 2 branching off from the inlet duct 1. The inlet duct 1 and air duct 2 may, for example, be used for ducting air from the cooling air flow to cool the stator vanes 9 or 12, respectively.

In the downstream direction, a counter-pressure duct 3 is provided by which pressure, for instance, from the turbine section of the engine, is applied to the rearward area of the piston 5 of the piston-cylinder unit 4. Furthermore, the piston-cylinder unit 4 comprises a spring 16 by which a suitable pre-load is applied to the piston 5 to bias the piston in the desired direction.

During operations with a high pressure difference, the pressure force in the inlet duct 1 exceeds the sum of the pressure force in the counter-pressure duct and of the pre-load force of the spring 16. The piston 5 is accordingly displaced such that the flow area of the air duct 2 is cleared. During operations with a low pressure difference, the pressure force in the counter-pressure duct 3, together with the pre-load force applied by the spring 16, exceeds the pressure force in the inlet duct 1, with the effect that the piston 5 is displaced to partly cover the free cross-section of the air duct 2, thus reducing the supply of air.

The present disclosure seeks further to make efficient use of air flows for the purposes of cooling vanes.

SUMMARY

In accordance with the present disclosure there is provided a vane cooling system for a gas turbine engine. The system includes a vane arranged on a stator and having a chamber extending continuously from a radially inner end to a radially outer end of the vane. The vane has a radially inner inlet and a radially outer inlet. A first cooling fluid feed is in communication with the radially inner inlet, and a second cooling fluid feed is in communication with the radially outer inlet. The first cooling fluid feed has a higher pressure than the second cooling feed, and a flow adjustment device is arranged for adjusting a flow of the second cooling fluid feed into the radially outer inlet.

At lower power operation, the vane is cooled by cooling fluid from the first cooling fluid feed. The pressure and temperature of this feed may be optimized for a known low power operating condition of the engine. For example, this may be a cruising condition. When the engine is operating at this known condition, the flow adjustment device may be partially or wholly closed to maintain a low constant flow or cease flow entirely. During operations which require higher power (and so increased cooling effort), the flow adjustment device may be adjusted to increase the flow introducing a top-up of cooling fluid from the second cooling fluid feed.

The vane may be provided with multiple outlets for the cooling fluid. The outlets may be provided as an array of holes. For example, the array of holes is arranged along or adjacent a trailing edge of the vane. The outlets may be configured to direct the spent cooling fluid into a working fluid flow passing through an annulus in which the vane sits.

The first and second cooling fluid feeds may tap cooling air from the compressor. The first and second cooling fluids may tap from the same location on the compressor or different locations on the compressor. For example, the first and/or second cooling fluid feeds tap off upstream of the outlet guide vane (OGV) of the compressor.

One or both inlets may be obstructed by a flow restrictor, the flow restrictor configured to control the pressure of fluid passing into the chamber.

The flow adjustment device may have a simple open-closed configuration. Alternatively, the flow adjustment device may be variable to provide a variable range of settings when open as well as a closed setting.

The radially outer inlet may cross an axially extending annular cavity between a radially outer casing and the radially outer end of the vane. Optionally, the radially outer inlet is arranged in fluid communication with the axially extending annular cavity.

Between vanes, the axially extending annular cavity may be defined by the radially outer casing and a segmented annular blade ring. Within an engine, the segmented annular blade ring sits radially adjacent tips of rotating blades of a rotor arranged axially adjacent the stator. Segments of the annular blade ring may be suspended from a radially inner surface of the radially outer casing, for example by means of segment hooks. The segments may define one or more radially inwardly directed gaps through which cooling fluid may pass from the axially extending annular cavity into an annulus in which the vane is located.

In some embodiments, the segments and adjacent radially outer casing may be configured to maintain a constant pressure in the axially extending annular cavity when cooling air enters the radially outer inlet. In an option, this may be achieved by dividing the annular space bounded by the casing and the segment into multiple cavities each in fluid communication. Entry and exit holes connecting the cavities may be proportioned to balance pressures within the axially extending annular cavity. Such an arrangement can discourage seal leakage to beneficially direct more cooling fluid to surfaces in need of cooling.

BRIEF DESCRIPTION OF DRAWINGS

Embodiments of the present disclosure will now be described with reference to the accompanying Figures in which.

DETAILED DESCRIPTION

FIG. 1 has been described in more detail above.

Figure 2:
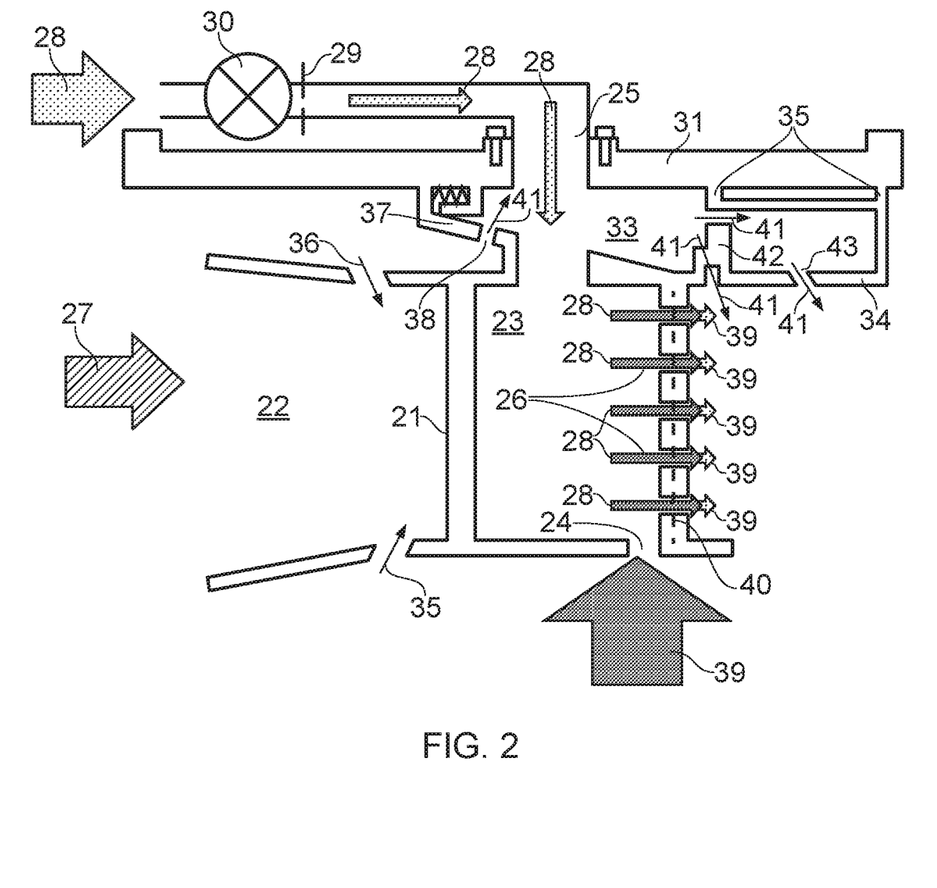
FIG. 2 shows a first embodiment of a vane cooling system in accordance with the present disclosure.

FIG. 2 shows a stator vane 21 spanning an annulus 22 of a gas turbine engine the vane has a hollow cavity 23 which has a radially inner inlet 24 and a radially outer inlet 25. Along a trailing edge of the stator vane is an array of outlets 26 opening through the a wall of the vane 21 and directed in line with a flow of working fluid 27 flowing through the annulus 22. Axially upstream of the vane 21 (with respect to the direction of flow 27 of the working fluid), is a compressor (not shown). A first feed 28 is tapped from the compressor. The feed is arranged in fluid communication with the radially outer inlet 25. The feed 28 entering the radially outer inlet 25 may be controlled by means of a flow restrictor 29 obstructing a path of the feed 28 to the inlet 25. The feed 28 may be opened or closed by means of valve 30. The inlet 25 passes through an annular casing 31 into the cavity 23 crossing an axially extending annular cavity 33. Downstream of the vane 21, the axially extending annular cavity 33 is bounded on a radially inward side and an axially downstream side by a segmented ring 34. Segments of the segmented ring 34 are suspended from the casing 31 by means of suspension hooks 35.

Rear inner 35 and rear outer 36 discharge flows are drawn into the annulus 22 to join the working fluid flow 27. A flow may pass through a sloped bulk head 37 via one or more orifices 38.

A second feed 39 supplies a radially inner inlet 24. Proportions of orifice 38 and inlet 24 are selected so as optimize cooling flow in the cavity 23 for a cruising operation of the engine. During a cruising operation the valve 30 to first feed 28 may be closed. During a higher power operation such as maximum take-off, the valve 30 is opened allowing the flow in the cavity 23 to be topped up with air from feed 28. The valve 30 may be adjustable to provide an optimum flow for the operating condition.

A flow 41 passes into the axially extending annular cavity 33 and a pressure differential downstream of the vane throat 40 draws a portion back into the working fluid flow 27 in the annulus 22 via a gap 42 between a chordal seal and the segmented ring, and a gap 43 between or through the seal segments. A further portion of the flow 41 may be exhausted.

Figure 3:
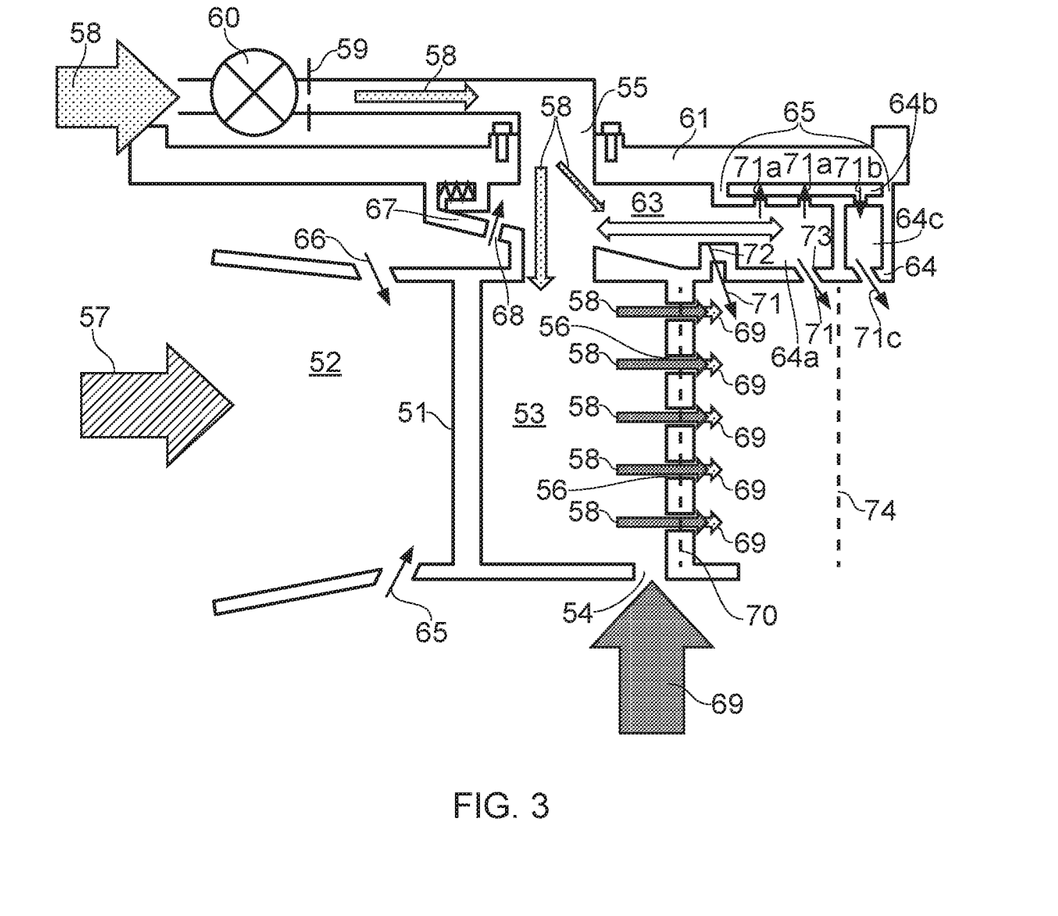
FIG. 3 shows a second embodiment of a vane cooling system in accordance with the present disclosure.

FIG. 3 shows a second embodiment of a vane cooling system in accordance with the present disclosure. The arrangement has many features in common with the arrangement of FIG. 2.

A stator vane 51 spanning an annulus 52 of a gas turbine engine the vane has a hollow cavity 53 which has a radially inner inlet 54 and a radially outer inlet 55. Along a trailing edge of the stator vane is an array of outlets 56 opening through vane 51 and directed in line with a flow of working fluid 57 flowing through the annulus 52. Axially upstream of the vane 51 (with respect to the direction of flow 57 of the working fluid), is a compressor (not shown). A first feed 58 is tapped from the compressor upstream. The feed is arranged in fluid communication with the radially outer inlet 55. The feed 58 entering the radially outer inlet 55 may be controlled by means of a flow restrictor 59 obstructing a path of the feed 58 to the inlet 55. The feed 58 may be opened or closed by means of valve 60. The inlet 55 passes through an annular casing 61 into the cavity 53 crossing an axially extending annular cavity 63. Downstream of the vane 51, the axially extending annular cavity 63 is bounded on a radially inward side and axially rearward by a segmented ring 64. Segments of the segmented ring 64 are suspended from the casing 61 by means of suspension hooks 65.

Rear inner 65 and rear outer 66 discharge flows are drawn into the annulus 52 to join the working fluid flow 57. A flow may pass through a sloped bulk head 67 via one or more orifices 68.

A second feed 69 supplies a radially inner inlet 54. Proportions of orifice 68 and inlet 54 are selected so as optimize cooling flow in the cavity 53 for a cruising operation of the engine. During a cruising operation the valve 60 to first feed 58 is closed or turned to a constant low flow. During a higher power operation such as maximum take-off, the valve 60 is opened allowing the flow in the cavity 53 to be topped up with air from feed 58. The valve 60 may be adjustable to provide an optimum flow for the operating condition.

In contrast to the embodiment of FIG. 2, the space between the casing 61 and radially adjacent segment 64 is divided so as to define three compartments 64a, 64b, 64c. As can be seen, the compartments are in serial fluid communication provided by holes between compartments 64a and 64b and a hole between compartment 64b and 64c. Pressure differentials across the dividing walls between the compartments encourage impingement of leakage air 71a along a radially inner surface of the casing 61 to assist cooling. Spent air 71b is directed back through the segment and exits 71c to re-join the main work fluid flow 57 at a position just downstream of a throat plane 74 of a blade which sits adjacently downstream of the vane.

Figure 4:
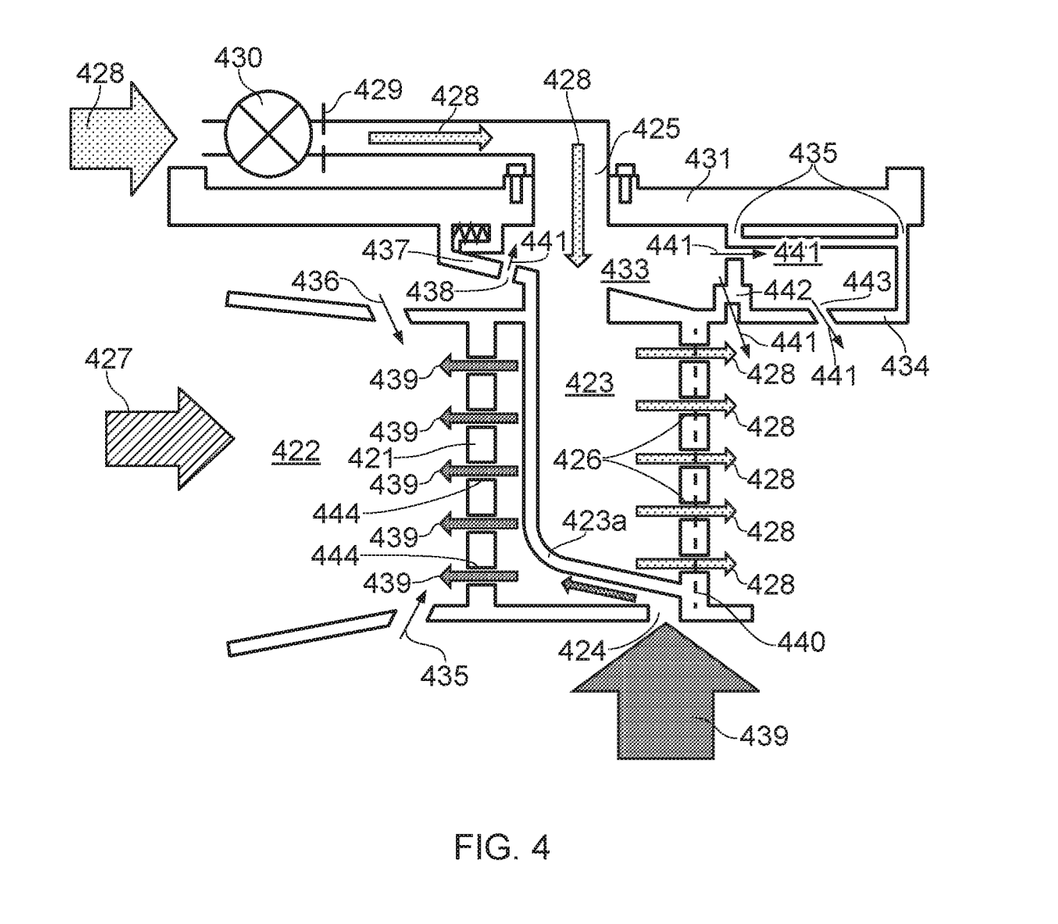
FIG. 4 shows a third embodiment of a vane cooling system in accordance with the present disclosure.

FIG. 4 shows a third embodiment of the present disclosure, the arrangement has many features in common with the embodiment of FIG. 2. The Figure shows a stator vane 421 spanning an annulus 422 of a gas turbine engine the vane 421 has a hollow cavity 423 which has a radially inner inlet 424 and a radially outer inlet 425. The cavity is divided by a wall 423a. The wall 423a extends substantially in parallel with a pressure surface side wall of the vane 421. The radially inner inlet 424 enters the cavity to a first side of the wall 423a and the radially outer inlet 425 enters the cavity to an opposite side of the wall 423a.

Along a trailing edge of the stator vane 421 is an array of outlets 426 opening into a throat plane 440 of the vane 421 and directed in line with a flow of working fluid 427 flowing through the annulus 422. Axially upstream of the vane 421 (with respect to the direction of flow 427 of the working fluid), is a compressor (not shown). A first feed 428 is tapped from the compressor upstream. The feed is arranged in fluid communication with the radially outer inlet 425. The feed 428 entering the radially outer inlet 425 may be controlled by means of a flow restrictor 429 obstructing a path of the feed 428 to the inlet 425. The feed 428 may be opened or closed by means of valve 430. The inlet 425 passes through an annular casing 431 into the cavity 423 crossing an axially extending annular cavity 433. Downstream of the vane 421, the axially extending annular cavity 433 is bounded on a radially inward side and an axially downstream side by a segmented ring 434. Segments of the segmented ring 434 are suspended from the casing 431 by means of suspension hooks 435.

Rear inner 435 and rear outer 436 discharge flows are drawn into the annulus 422 to join the working fluid flow 427. A flow may pass through a sloped bulk head 437 via one or more orifices 438.

A plurality of outlets 444 is arranged along the pressure side wall surface of the vane 421. A second feed 439 supplies a radially inner inlet 424. Proportions of orifice 438 and inlet 424 are selected so as optimize cooling flow in the pressure side wall side of the cavity 423 for a cruising operation of the engine. During a cruising operation the valve 430 to first feed 428 may be closed. Coolant supplied to the radially inner inlet 439 travels into the pressure side wall side cavity and exits through the outlets 444 to join the oncoming work fluid flow 427 as it passes through a passage between circumferentially adjacent vanes.

During a higher power operation such as maximum take-off, the valve 430 is opened allowing flow into cavity 423 from feed 428. The valve 430 may be adjustable to provide an optimum flow for the operating condition. Spent coolant flow joins the main work fluid flow as it exits via the outlets 426.

A flow 441 passes into the axially extending annular cavity 433 and a pressure differential downstream of the vane throat 440 draws a portion back into the working fluid flow 427 in the annulus 422 via a gap 442 between a chordal seal and the segmented ring, and a gap 443 between or through the seal segments. A further portion of the flow 441 may be exhausted.

Figure 5:
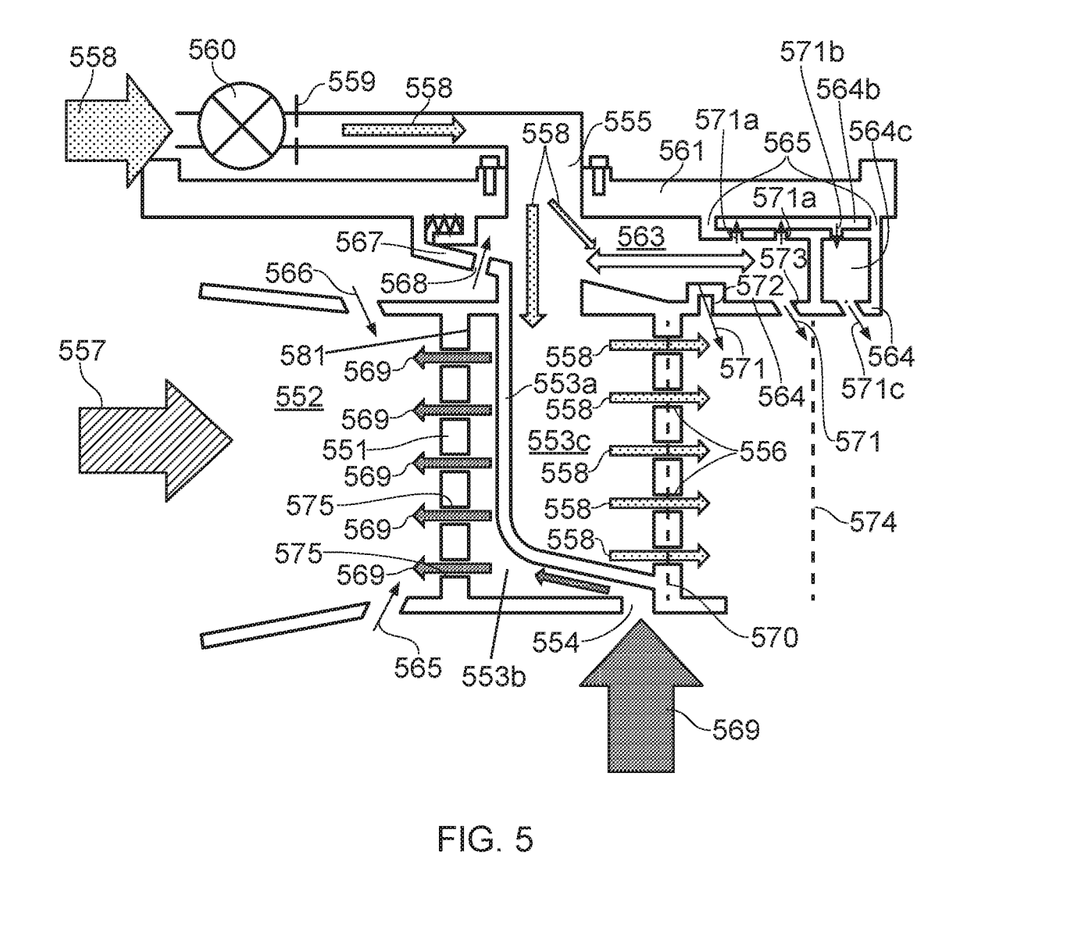
FIG. 5 shows a fourth embodiment of a vane cooling system in accordance with the present disclosure.

FIG. 5 shows a fourth embodiment of the present disclosure, the arrangement has many features in common with the embodiment of FIG. 3.

The figure shows a stator vane 551 spanning an annulus 552 of a gas turbine engine the vane has a hollow cavity 553 (553b and 553c) which has a radially inner inlet 554 and a radially outer inlet 555. The cavity 533 is divided by a wall 553a into a pressure side wall side cavity 553b and a suction side wall side cavity 553c. The wall 553a extends substantially in parallel with a pressure surface side wall of the vane 551. The radially inner inlet 554 enters the cavity to a first side of the wall 553a and the radially outer inlet 555 enters the cavity to an opposite side of the wall 553a.

Along a trailing edge of the stator vane 551 is an array of outlets 556 opening through the vane 551 and directed in line with a flow of working fluid 557 flowing through the annulus 552. Axially upstream of the vane 551 (with respect to the direction of flow 557 of the working fluid), is a compressor (not shown). A first feed 558 is tapped from the compressor upstream. The feed 558 is arranged in fluid communication with the radially outer inlet 555. The feed 558 entering the radially outer inlet 555 may be controlled by means of a flow restrictor 559 obstructing a path of the feed 558 to the inlet 555. The feed 558 may be opened, closed or have its flow adjusted by means of valve 560. The inlet 555 passes through an annular casing 561 into the cavity 553 crossing an axially extending annular cavity 563. Downstream of the vane 551, the axially extending annular cavity 563 is bounded on a radially inward side and axially rearward by a segmented ring 564. Segments of the segmented ring 564 are suspended from the casing 561 by means of suspension hooks 565.

Rear inner 565 and rear outer 566 discharge flows are drawn into the annulus 552 to join the working fluid flow 557. A flow may pass through a sloped bulk head 567 via one or more orifices 568.

A plurality of outlets 575 is arranged along the pressure side wall surface 581 of the vane 551. A second feed 569 supplies a radially inner inlet 554. Proportions of orifice 568 and inlet 554 are selected so as optimize cooling flow in the cavity 553 for a cruising operation of the engine. During a cruising operation, the valve 560 to first feed 558 is closed. Coolant supplied to the radially inner inlet 554 travels into the pressure side wall side cavity 553b and exits through the outlets 575 to join the oncoming work fluid flow 557 as it passes through a passage between circumferentially adjacent vanes.

During a higher power operation such as maximum take-off, the valve 560 is opened allowing flow into the suction side wall side cavity 553c from feed 558. The valve 560 may be adjustable to provide an optimum flow for the operating condition. Spent coolant flow joins the main work fluid flow 557 as it exits the outlets.

In contrast to the embodiment of FIG. 4, the space between the casing 561 and radially adjacent segment 564 is divided so as to define three compartments 564a, 564b, 564c. As can be seen, the compartments are in serial fluid communication provided by holes between compartments 564a and 564b and a hole between compartment 564b and 564c. Pressure differentials across the dividing walls between the compartments encourage impingement of leakage air 571a along a radially inner surface of the casing 561 to assist cooling. Spent air 571b is directed back through the segment and exits 571c to re-join the main work fluid flow 557 at a position just downstream of a throat plane 574 of a blade which sits adjacently downstream of the vane.

It will be understood that the invention is not limited to the embodiments above-described and various modifications and improvements can be made without departing from the invention as is defined by the appended claims. Except where mutually exclusive, any of the features may be employed separately or in combination with any other features and the disclosure extends to and includes all combinations and sub-combinations of one or more features described herein.

The invention claimed is:

1. A vane cooling system for a gas turbine engine, the system comprising:
 a vane arranged on a stator and having a chamber extending continuously from a radially inner end to a radially outer end of the vane;
 the vane having a radially inner inlet and a radially outer inlet;
 a first cooling fluid feed in communication with the radially inner inlet, wherein the chamber is configured to receive a flow of the first cooling fluid feed via the radially inner inlet;
 a second cooling fluid feed in communication with the radially outer inlet, wherein the chamber that is configured to receive the flow of the first cooling fluid feed via the radially inner inlet is also configured to receive a flow of the second cooling fluid feed via the radially outer inlet;
 the first cooling fluid feed having a higher pressure than the second cooling feed; and
 a valve configured to adjust the flow of the second cooling fluid feed into the radially outer inlet.

2. The vane cooling system as claimed in claim 1 wherein the vane is provided with an array of outlet holes arranged along or adjacent a trailing edge of the vane.

3. The vane cooling system as claimed in claim 2 wherein the array of outlet holes is configured to direct spent cooling fluid into a working fluid passing through an annulus in which the vane sits.

4. The vane cooling system as claimed in claim 1 wherein the first and second cooling fluid feeds tap cooling air from a compressor of the gas turbine engine.

5. The vane cooling system as claimed in claim 4 wherein the first and second cooling fluids tap from the same location on the compressor.

6. The vane cooling system as claimed in claim 1 wherein the radially outer inlet crosses an axially extending annular cavity between a radially outer casing and the radially outer end of the vane and the radially outer inlet is arranged in fluid communication with the axially extending annular cavity.

7. The vane cooling system as claimed in claim 1 wherein immediately downstream of the vane an axially extending annular cavity is defined by a radially outer casing and a segmented annular blade ring, segments of the annular blade ring being suspended from a radially inner surface of the radially outer casing and wherein an arrangement of the segments and adjacent radially outer casing is configured to maintain a constant pressure in the axially extending annular cavity when cooling air enters the radially outer inlet.

8. The vane cooling system as claimed in claim 7 wherein an annular space bounded by the casing and at least one of the segments of the annular blade ring is divided into multiple cavities in serial fluid communication.

9. The vane cooling system as claimed in claim 8 wherein the cavities include a cavity extending axially and wherein the cavity extending axially is disposed immediately radially adjacent the casing and holes connecting the cavities are configured to draw air from the axially extending annular cavity into the cavity extending axially and immediately radially adjacent the casing.

10. The vane cooling system as claimed in claim 1 wherein the chamber is divided by a wall whereby to define a pressure side wall side cavity bounded by a pressure side wall surface of the vane and a suction side wall side cavity and wherein the radially outer inlet opens into the suction side wall side cavity and the radially inner inlet opens into the pressure side wall side cavity.

11. The vane cooling system as claimed in claim 10 further including a plurality of outlets arranged in the pressure surface side wall of the vane.

12. The vane cooling system as claimed in claim 11 wherein the outlets arranged in the pressure surface side wall of the vane are directed toward a direction of flow of a work fluid.

13. A gas turbine engine comprising: a turbine section, the turbine section incorporating the vane cooling system as claimed in claim 1.

14. The vane cooling system as claimed in claim 1, wherein the valve is configured to wholly close to cease flow entirely of the second cooling fluid feed into the radially outer inlet if the gas turbine engine is in a cruising operation.

15. A vane cooling system for a gas turbine engine, the system comprising:
 a vane arranged on a stator and having a chamber extending continuously from a radially inner end to a radially outer end of the vane;
 the vane having a radially inner inlet and a radially outer inlet;
 a first cooling fluid feed in communication with the radially inner inlet;
 a second cooling fluid feed in communication with the radially outer inlet;
 the first cooling fluid feed having a higher pressure than the second cooling feed; and
 a flow adjustment device arranged for adjusting a flow of the second cooling fluid feed into the radially outer inlet, wherein immediately downstream of the vane the axially extending annular cavity is defined by a radially outer casing and a segmented annular blade ring, segments of the annular blade ring suspended from a radially inner surface of the radially outer casing, wherein an arrangement of the segments and adjacent radially outer casing is configured to maintain a constant pressure in the axially extending annular cavity when cooling air enters the radially outer inlet, wherein an annular space bounded by the casing and the segment is divided into multiple cavities in serial fluid communication, wherein the cavities include a cavity extending axially and immediately radially adjacent the casing and holes connecting the cavities are configured to draw air from the axially extending annular cavity into the cavity extending axially and immediately radially adjacent the casing.

* * * * *